(12) United States Patent
Adachi (10) Patent No.: US 11,043,672 B2
(45) Date of Patent: Jun. 22, 2021

(54) NEGATIVE ELECTRODE MATERIAL INCLUDING LEAD FLUORIDE COATED ACTIVE MATERIAL AND ELECTROLYTE BATTERY USING SAME

(71) Applicant: TOYOTA JIDOSHA KABUSHIKI KAISHA, Toyota (JP)

(72) Inventor: Masaki Adachi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 105 days.

(21) Appl. No.: 16/353,256

(22) Filed: Mar. 14, 2019

(65) Prior Publication Data

US 2019/0296352 A1 Sep. 26, 2019

(30) Foreign Application Priority Data

Mar. 26, 2018 (JP) ............................... JP2018-058322

(51) Int. Cl.
*H01M 4/583* (2010.01)
*H01M 4/04* (2006.01)
*H01M 4/133* (2010.01)
*H01M 10/0525* (2010.01)
*H01M 4/36* (2006.01)
*H01M 4/56* (2006.01)
(Continued)

(52) U.S. Cl.
CPC ......... *H01M 4/583* (2013.01); *H01M 4/0402* (2013.01); *H01M 4/133* (2013.01); *H01M 4/366* (2013.01); *H01M 4/56* (2013.01); *H01M 4/582* (2013.01); *H01M 4/5835* (2013.01); *H01M 10/0525* (2013.01); *H01M 4/388* (2013.01); *H01M 10/052* (2013.01); *H01M 2004/021* (2013.01); *H01M 2004/027* (2013.01)

(58) Field of Classification Search
CPC .... H01M 4/583; H01M 4/0402; H01M 4/133; H01M 4/366; H01M 4/56; H01M 4/582; H01M 4/5835
USPC ............................................ 429/218.1, 231.8
See application file for complete search history.

(56) References Cited

U.S. PATENT DOCUMENTS

2006/0068283 A1  3/2006 Segawa et al.
2016/0190597 A1* 6/2016 Kim .................... H01M 10/052
                                                429/218.1
(Continued)

FOREIGN PATENT DOCUMENTS

EP    1873850 A1    1/2008
EP    2262042 A1    12/2010
(Continued)

OTHER PUBLICATIONS

Lorena L. Garza Tovar et al., "Investigation of lead tin fluorides as possible negative electrodes for Li-ion batteries", Journal of Power Sources, vol. 97-98, Elsevier, 2001, pp. 258-261, 4 pages total.
(Continued)

*Primary Examiner* — Sean P Cullen
(74) *Attorney, Agent, or Firm* — Sughrue Mion, PLLC (57) ABSTRACT

One aspect of the invention provides a negative electrode material for use in an electrolyte battery including a negative electrode active material and a coating material disposed on a surface of the negative electrode active material. The coating material is a fluoride ion conductor that includes the elements lead and fluorine.

6 Claims, 3 Drawing Sheets

(51) Int. Cl.

| | | |
|---|---|---|
| *H01M 4/58* | (2010.01) | |
| *H01M 4/02* | (2006.01) | |
| *H01M 4/38* | (2006.01) | |
| *H01M 10/052* | (2010.01) | |

(56) References Cited

U.S. PATENT DOCUMENTS

| | | | |
|---|---|---|---|
| 2017/0077497 A1* | 3/2017 | Ogata | H01M 4/622 |
| 2017/0092932 A1 | 3/2017 | Kim | |
| 2017/0104237 A1 | 4/2017 | Shibutani et al. | |
| 2018/0175382 A1* | 6/2018 | Chou | H01M 4/134 |
| 2018/0309127 A1* | 10/2018 | Miki | H01M 6/183 |

FOREIGN PATENT DOCUMENTS

| | | | | |
|---|---|---|---|---|
| EP | 3410518 A1 | 12/2018 | | |
| JP | 05-325973 A | 12/1993 | | |
| JP | 2005-276517 A | 10/2005 | | |
| JP | 4660104 B2 | 1/2011 | | |
| KR | 20080093242 A | * 10/2008 | ......... | H01M 4/0404 |

OTHER PUBLICATIONS

Mohamad M Ahmad et al., "Dielectric relaxation properties of $P_{1-x}Sn_xF_2$ solid solutions prepared by mechanochemical milling", Journal of Physics D: Applies Physics, Institute of Physics Publishing LTD, GB, vol. 40, No. 19, pp. 6020-6025, 6 pages total.

* cited by examiner

NEGATIVE ELECTRODE MATERIAL INCLUDING LEAD FLUORIDE COATED ACTIVE MATERIAL AND ELECTROLYTE BATTERY USING SAME

CROSS REFERENCE TO RELATED APPLICATIONS

This application claims the benefit of priority to Japanese Patent Application No, 2018-058322 filed on Mar. 26, 2018. The entire contents of this application are hereby incorporated herein by reference.

BACKGROUND OF THE DISCLOSURE

1. Field

The present invention relates to a negative electrode material and to an electrolyte battery using the same.

2. Background

Japanese Patent Application Laid-open No. 2005-276517 discloses both an electrolyte that includes a fluorinated ketone having a given chemical formula, and a lithium ion battery that uses this electrolyte.

SUMMARY

The fluorine-containing solvents mentioned in Japanese Patent Application Laid-open No. 2005-276517 have higher oxidative decomposition potentials than fluorine-free solvents. That is, they have a high oxidation resistance. Therefore, in electrolyte batteries which contain such a fluorine-containing solvent, the electrolyte does not readily undergo oxidative decomposition when the positive electrode reaches a high potential. However, unlike their high oxidation resistance, such fluorine-containing solvents have a low reduction resistance. According to the findings of the present inventor, in lithium ion batteries which contain such a fluorine-containing solvent, then many lithium ions are positioned near the negative electrode during charging, electrons as counterparts to the lithium ions concentrate at the surface of the negative electrode. This places the fluorine-containing solvent in a receptive state for receiving electrons from the negative electrode. As a result, in lithium ion batteries which contain a fluorine-containing solvent, reductive decomposition of the fluorine-containing solvent readily arises at the negative electrode. Therefore, a drawback of lithium ion batteries which contain a fluorine-containing solvent is that they have a low durability.

With the foregoing in view, it is an object of the present invention to provide a negative electrode material which can be used to produce an electrolyte battery of high durability that contains a fluorine-containing solvent. Another, related object is to provide an electrolyte battery having excellent cycle characteristics.

Accordingly, in one aspect, the invention provides a negative electrode material for an electrolyte battery, which material includes a negative electrode active material and a coating material disposed on a surface of the negative electrode active material. The coating material is a fluoride ion conductor that includes the elements lead and fluorine.

In the negative electrode material, the fluoride ion conductor is provided on a surface of the negative electrode active material. This makes it easier for negative charge to build up at the surface of the negative electrode (specifically, the interface of the negative electrode with the electrolyte) in the state of fluoride ions rather than electrons. As a result, the fluorine-containing solvent is less likely to receive electrons from the negative electrode. In other words, electron transfer from the negative electrode to the fluorine-containing solvent does not readily arise. Therefore, even in cases where the electrolyte includes a fluorine-containing solvent, reductive decomposition of the electrolyte can be suitably suppressed. As a result, an electrolyte battery having excellent cycle characteristics and a high durability can be achieved.

In one aspect of the negative electrode material disclosed herein, the fluoride ion conductor includes a solid solution of the following formula (1):

$$Pb_{(1-x)}Sn_xF_{2-\delta} \qquad (1)$$

(wherein x satisfies $0 \le x \le 0.6$ and $\delta$ is a real number that satisfies charge neutrality). This enables a higher fluoride ion conductivity to be exhibited in the room temperature region. The advantageous effects of the art disclosed herein are thus better manifested, making it possible to suppress to a greater degree decreases in battery capacity after charge-discharge cycling.

In one aspect of the negative electrode material disclosed herein, x in formula (1) may satisfy the condition $0 \le x \le 0.2$. This enables the fluoride ion conductivity of the coating material to be further increased, making it possible to suppress to an even greater degree decreases in battery capacity after charge-discharge cycling.

In one aspect of the negative electrode material disclosed herein, the coating material has an average coating thickness of at least 10 nm and up to 100 nm. This enables the internal resistance of the negative electrode to be reduced to a high degree, enabling excellent input-output characteristics to be achieved. Moreover, the amount of negative electrode active material in the negative electrode can be relatively increased, making it possible to advantageously achieve electrolyte battery having a high energy density.

In a second aspect, the invention provides an electrolyte battery having a positive electrode, a negative electrode which includes the negative electrode material, and an electrolyte which includes a fluorine-containing solvent. This electrolyte battery, even when repeatedly charged and discharged, does not readily undergo a decrease in battery capacity and has excellent cycle characteristics.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the art disclosed herein are described below in conjunction with the diagrams. Note that technical matters which are required for carrying out the present invention (e.g., other battery components that are not distinctive to the art disclosed herein, and ordinary production processes for batteries) but are other than those concerning which particular mention is made in the present specification (e.g., composition and properties of negative electrode material) may be understood as matters for design by persons of ordinary skill in the art based on prior art in the field. The invention disclosed herein may be carried out based on the technical details disclosed in the specification and on common general technical knowledge in the field. In the attached drawings, members or features having like functions are designated by like symbols, and repeated explanations may be omitted or simplified. Dimensional relationships (length, width, thickness, etc.) in the diagrams do not necessarily reflect actual dimensional relationships. Also, in the present specification, numerical ranges denoted as "A to B" (where A and B may be any numerical values) are intended to mean "at least A and up to B."

Negative Electrode Material

Figure 1:
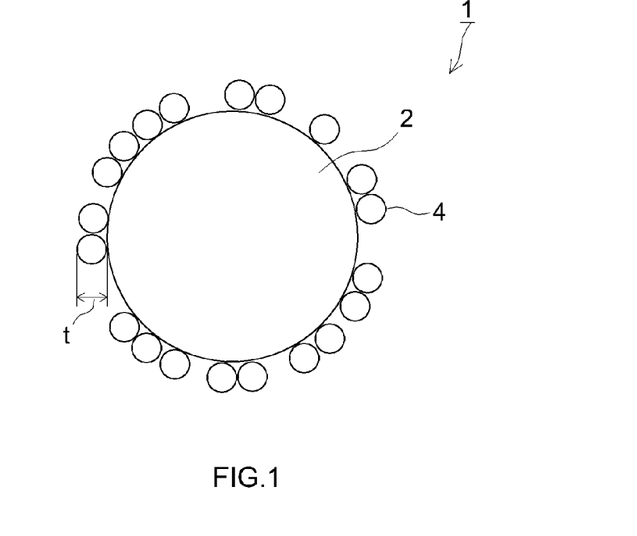
FIG. 1 is a schematic view showing the cross-sectional structure of a negative electrode material according to an embodiment of the invention.

FIG. 1 is a schematic view showing the cross-sectional structure of a negative electrode material 1 according to an embodiment of the invention. Although not intended to be particularly imitative, this negative electrode material 1 is used by way of illustration in the following detailed description of the art disclosed herein.

The negative electrode material 1 is a material that can be used in the negative electrode of an electrolyte battery. The negative electrode material 1 is made up of composite particles. The negative electrode material 1 includes a negative electrode active material 2 and a coating material 4. The negative electrode active material 2 is a portion serving as the core of the negative electrode material 1. The coating material 4 is disposed on a surface of the negative electrode active material 2. The coating material 4 is disposed on a side that is closer to the electrolyte than to the negative electrode active material 2. In the present embodiment, a plurality of coating materials 4 are arranged discontinuously, such as in the form of dots (islands), on the surface of the negative electrode active material 2. A portion of the surface of the negative electrode active material 2 is not covered with the coating material 4 and is in direct contact with the electrolyte. The coating material 4 physically and/or chemical adheres to the surface of the negative electrode active material 2. The negative electrode material 1 has interfaces where the negative electrode active material 2 and the coating material 4 come into mutual contact. The negative electrode active material 2 and the coating material 4 adhere to each other and are integrally united.

The negative electrode active material 2 should be a material which is capable of reversibly intercalating and deintercalating the charge carrier (in a lithium ion battery, the charge carrier is lithiumions). The negative electrode active material 2 is not particularly limited; one or two or more types may be suitably selected and used from among those that have hitherto been used in the art. Specific examples of negative electrode active materials 2 include carbon materials such as natural graphite, synthetic graphite, amorphous coated graphite, non-graphitizable carbon (hard carbon) and graphitizable carbon (soft carbon), lithium-transition metal composite oxides such as lithium-titanium composite oxides; and silicon compounds. Of these, in cases where a graphitic carbon material such as natural graphite, synthetic graphite or amorphous coated graphite is used as the negative electrode active material 2, reductive decomposition of the electrolyte originating at carbon edge faces has a tendency to arise at the negative electrode. Application of the art disclosed herein is thus desirable in such cases. In this specification, "graphitic carbon material" refers to a carbon material in which the amount of graphite is generally at least 50 wt %, and typically at least 80 wt %.

In the present embodiment, the negative electrode active material 2 is in the form of particles. The average particle size of the negative electrode active material 2, although not particularly limited, is generally from 0.5 to 50 µm, and typically from 1 to 30 µm. For example, an average particle size of from 10 to 25 µm is desirable. In this specification, "average particle size" refers to the particle size at 50% on the cumulative volume curve from the small particle diameter side in the volume-basis particle size distribution measured using a laser diffraction scattering method. Also, the negative electrode active material 2 is preferably, although not particularly limited to, approximately spherical with an average aspect ratio (major axis/minor axis ratio) of from about 1 to about 1.5, for example, spherical with an average aspect ratio of from 1 to 1.3. This makes it possible to improve the workability when placing the coating material 4 thereon and improve the handleability of the negative electrode material 1.

The coating material 4 is a material which exhibits fluoride ion conductivity, i.e., a fluoride ion conductor. The fluoride ion conductor has a fluoride ion conductivity at room temperature (25° C.), based on the alternating current impedance method, of generally at least $10^{-6}$ S/cm, preferably at least $10^{-5}$ S/cm, more preferably at least $10^{-4}$ S/cm, and especially at least $10^{-3}$ S/cm. For example, the fluoride ion conductivity may be at least $10^{-2}$ S/cm. The coating material 4 is situated between the negative electrode active material 2 and the electrolyte and has the function of suppressing reductive decomposition of the electrolyte. This is described more fully below while referring to FIGS. 1 and 2.

Figure 2:
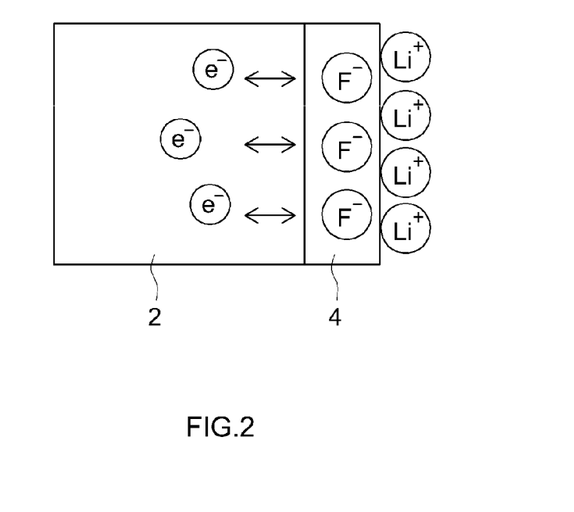
FIG. 2 is a partially enlarged schematic view of the cross-section of the negative electrode material in a lithium ion battery when the battery has been charged.

FIG. 2 is a partially enlarged schematic view of the cross-section of the negative electrode material 1 in a lithium ion battery when the battery has been charged. As shown in FIG. 2, in the negative electrode material 1, when the concentration of nearby lithium ions WO is high, the concentration of fluoride ions, as counterparts to the lithium ions, in the coating material 4 becomes high. In other words, in negative electrode material 1, a negative charge builds up in the state of fluoride ions rather than electrons at the surface of the negative electrode material 1. Hence, owing to electrostatic repulsions with the fluoride ions, electrons have difficulty concentrating at the surface of the negative electrode active material 2. As a result, electron transfer from the negative electrode material 1 to the fluorine-containing solvent does not readily arise, enabling reductive decomposition of the fluorine-containing solvent to be suitably suppressed. In addition, because the coating material 4 is a fluoride ion conductor, it has a high affinity to fluorine-containing solvents. Hence, the wettability by fluorine-containing solvents increases, making it possible to hold down the interfacial resistance.

Aside from including the elements lead and fluorine, the fluoride ion conductor is not particularly limited; one or two or more types may be suitably selected and used from among known fluoride ion conductors. For example, use can be made of one or two or more materials known to be capable of use as solid electrolytes in fluoride ion batteries. A specific example of a fluoride ion conductor is $PbF_2$, which consists of lead and fluorine. Additional examples include metal solid solutions and intermetallic compounds which include lead, one or two or more metal elements other than lead, and fluorine. These are exemplified by $PbF_2$—$SnF_2$ based materials which include lead (Pb), tin (Sn) and fluorine (F). Examples of PbF$_2$—SnF$_2$ based materials include (Pb, Sn)F$_2$-based solid solutions, and intermetallic compounds such as PbSnF$_4$, Pb$_2$SnF$_6$ and PbSn$_4$F$_{10}$.

Of these, (Pb, Sn)F$_2$-based solid solutions have a relatively high fluoride ion conductivity in the room temperature region (e.g., in a 25° C. to 60° C. environment), and so can be advantageously used. Suitable examples of (Pb, Sn)F$_2$-based solid solutions include materials of the following formula.

In formula (1), x determines the molar ratio of Pb and Sn. x satisfies the condition 0≤x≤0.6. For example, x may be such that x≤0.5, such that x≤0.4, such that x≤0.3, or such that x≤0.2. By setting the value of x at or below a given value, that is, by keeping the amount of Sn low, a higher fluoride ion conductivity can be exhibited in the room temperature region, enabling the advantageous effects of the art disclosed herein to be exhibited to a greater degree. On the other hand, from the standpoint of lowering the amount of Pb, x may be such that 0.2≤x, 0.3≤x, or 0.4≤x.

In formula (1), δ is a real number that satisfies charge neutrality. The number δ typically satisfies the condition −2<δ≤2. For example, it may satisfy the condition −1≤δ≤1, or may even satisfy the condition −0.5≤δ≤0.5.

The PbF$_2$—SnF$_2$ based material may include elements other than Pb, Sn and F, provided that doing so does not greatly lower the advantageous effects of the art disclosed herein. For example, metal elements other than Pb and Sn may be included. Metal elements other than Pb and Sn that may be included in the PbF$_2$—SnF$_2$ based material are exemplified by transition metal elements having a smaller ionic radius than Pb, and may include a first transition metal element such as titanium (Ti) and a second transition metal element such as zirconium (Zr). By including a transition metal element having a smaller ionic radius than Pb, the gaps between the atoms making up the PbF$_2$—SnF$_2$ based material become larger. As a result, the mobility of charge carrier ions in the coating material 4 can be enhanced. It is therefore possible to further improve, for example, the input-output characteristics of electrolyte batteries. To enhance the chemical stability and durability of the PbF$_2$—SnF$_2$ based material, the PbF$_2$—SnF$_2$ based material may include zirconium (Zr) and/or tungsten (W). The types and amounts of metal elements making up the coating material 4 can be measured by, for example, high-frequency inductively coupled plasma (ICP) emission spectroscopic analysis.

The coating material 4 may be arranged so as to cover only a portion of the surface of the negative electrode active material 2, as shown in FIG. 1. The coating material 4 may be arranged so as to cover at least about one-half, and typically at least 80%, such as at least 90%, of the total surface area of the negative electrode active material 2. Alternatively, the coating material 4 may be arranged so as to cover the entire surface area of the negative electrode active material 2. In FIG. 1, a particulate coating material 4 is coated as a single layer on the surface of the negative electrode active material 2, but the present invention is not limited in this respect. The surface of the negative electrode active material 2 may be coated with a plurality of layers of the particulate coating material 4.

The coating material 4 may be fused onto the surface of the negative electrode active material 2, although the invention is not limited in this respect. Electrostatic repulsions can be thereby increased compared with cases in which the negative electrode active material 2 and the coating material 4 are merely in surface contact. This enables the advantageous effects of the art disclosed herein to be exhibited to an even higher degree. In addition, the diffusion resistance of the negative electrode material 1 can be kept low. In this specification, "fusion" refers to the negative electrode active material 2 and the coating material 4 being bonded together at an atomic level or molecular level such that the particles are integrally united with each other and have no boundaries therebetween. Fusion between the particles can be confirmed by, for example, examining the negative electrode material 1 with an electron microscope such as a transmission electron microscope (TEM) and checking that there are no discernible boundary lines between the particles of the negative electrode active material 2 and the coating material 4.

The average coating thickness t of the coating material 4, although not particularly limited, is generally at least 2 nm, preferably at least 4 nm, more preferably at least 6 nm, even more preferably at least 8 nm, and still more preferably at least 10 nm. This enables the advantageous effects of the coating material 4 to be exhibited to a high degree, and reductive decomposition of the electrolyte to be better suppressed. Also, the average coating thickness t of the coating material 4 is generally not more than 1 μm (1,000 nm), preferably not more than 500 nm, more preferably not more than 200 nm, and even more preferably not more than 100 nm. This makes it possible to reduce the internal resistance at the negative electrode and thereby achieve an electrolyte battery having excellent input-output characteristics. Moreover, the relative amount of negative electrode active material 2 is increased, enabling an electrolyte battery having a high energy density to be achieved. The average coating thickness t of the coating material 4 can be determined from a sectional image of the negative electrode material 1 obtained by cutting the negative electrode material 1 at a random place and examining the cross-section with an electron microscope.

The average particle size of the negative electrode material 1, although not particularly limited, is generally from 0.5 to 50 μm, and typically from 1 to 30 μm, such as from 10 to 25 μm. The negative e material 1 is preferably, although not particularly limited to, approximately spherical with an average aspect ratio of from about 1 to about 1.5, for example, spherical with an average aspect ratio of from 1 to 1.3.

A negative electrode material 1 such as that described above can be produced by a method which includes the step of depositing the coating material 4 on the surface of the negative electrode active material 2. Various known methods, such as barrel sputtering, barrel pulsed laser deposition (PLD), chemical vapor deposition (CVD), vacuum deposition, electrostatic atomization, dry mixing (a solid phase process) and wet mixing (a liquid phase process) may be suitably used as the method for depositing the coating material 4 on the surface of the negative electrode active material 2. Of these, methods that employ a barrel method capable of stably carrying out coating on a powdery negative electrode active material 2, such as barrel sputtering and barrel PLD, are preferred. For example, in cases where barrel PLD is employed, one or two or more of the coating materials 4 described above may be used as the target to deposit a film of the coating material 4 on the surfaces of particles of the negative electrode active material 2 while rotating the particles. With barrel sputtering and barrel PLD, the coating material 4 can be suitably formed to the desired average coating thickness t by adjusting the deposition time.

Alternatively, in cases where, for example, a dry mixing method is used, the negative electrode active material 2 and the coating material 4 may be mixed together in a particulate state and heat-treated at a temperature of, for example, about 500° C. to about 1,000° C. It is desirable to set the average particle size of the coating material 4 so as to be smaller than the average particle size of the negative electrode active material 2, generally from 1 to 500 nm, and typically from 2 to 200 nm, such as from 5 to 100 nm. Or, in cases where a wet mixing method is used, first a source of Pb, a source of Sn and a source of F are respectively weighed out in the molar ratios of formula (1) and mixed together in a solvent so as to prepare a coating liquid. This coating liquid is then mixed together with the negative electrode active material 2 in a given ratio. Next, the mixture of the coating liquid and the negative electrode active material 2 is heat-treated at a temperature of, for example, 500° C. to 1,000° C. It is possible in this way to produce a negative electrode material 1 like that in FIG. 1.

Negative Electrode for Electrolyte Battery

The negative electrode (not shown) of the electrolyte battery typically has a negative electrode current collector and a negative electrode active material layer formed on the negative electrode current collector. The negative electrode current collector is exemplified by a copper or other metal foil. The negative electrode active material layer includes at least negative electrode material 1. In addition to the negative electrode material 1, the negative electrode active material layer may also include optional ingredients such as a binder, a thickener and a dispersant. The negative electrode active material layer preferably does not include any material (e.g., a conductor) having a higher electrical conductivity than the negative electrode active material 2. Examples of binders include rubbers such as styrene-butadiene rubber (SBR) and halogenated vinyl resins such as polyvinylidene fluoride (PVdF) Examples of thickeners include celluloses such as carboxymethylcellulose (CMC).

Electrolyte Battery

The negative electrode can be suitably used in building an electrolyte battery. In this specification, "electrolyte battery" is a term that encompasses all batteries equipped with an electric power-generating element and a liquid electrolyte electrolyte in liquid form). The electrolyte battery may be a primary battery, or may be a storage battery (secondary battery) or storage cell that can be repeatedly used. Examples of electrolyte batteries include lithium ion primary batteries, lithium ion secondary, batteries, nickel-hydrogen batteries, lithium ion capacitors and electric double-layer capacitors. However, batteries that use fluoride ions as the charge carrier ions are typically excluded. Also, in this specification, "lithium ion battery" is a term which refers to all batteries in which lithium ions serve as the charge carrier ions, and encompasses, for example, lithium ion primary battery, lithium ion secondary batteries and lithium ion capacitors. In the art disclosed herein, the electrolyte battery is equipped with a positive electrode, a negative electrode that includes the negative electrode material 1, and an electrolyte.

The positive electrode of the electrolyte battery may be similar to positive electrodes used in the prior art and is not particularly limited. The positive electrode typically has a positive electrode current collector and a positive electrode active material layer formed on the positive electrode current collector. The positive electrode current collector is exemplified by aluminum and other metal foils. The positive electrode active material layer includes at least a positive electrode active material. The positive electrode active material is exemplified by lithium-transition metal composite oxides such as lithium-nickel containing composite oxides, lithium-cobalt containing composite oxides, lithium-nickel-manganese containing composite oxides, and lithium-nickel-manganese-cobalt containing composite oxides. Of these, lithium-transition metal composite oxides having an open-circuit voltage versus lithium metal of at least 4.3 V, and preferably at least 4.5 V, are preferred. This allows the working voltage of the positive electrode to be set to a high value, enabling an electrolyte battery having a high energy density to be achieved.

In addition to the positive electrode active material, the positive electrode active material layer may also include optional ingredients such as an electrical conductor, a binder and a dispersant. Examples of conductors include carbon black, typically acetylene black or ketjen black. Examples of the binder include halogenated vinyl resins such as polyvinylidene fluoride (PVdF), and polyalkylene oxides such as polyethylene oxide (PEO).

The electrolyte of the electrolyte battery may be similar to electrolytes used in the prior art and is not particularly limited. The electrolyte is a liquid electrolyte that exhibits a liquid state at room temperature (25° C.). The electrolyte is preferably one which always exhibits a liquid state within the temperature range of use (e.g., −20° C. to 60° C.). The electrolyte typically includes a supporting salt and a solvent. The supporting salt dissociates within the solvent, forming charge carrier ions. The supporting salt typically forms positive charge carrier ions (cations). For example, in a lithium ion battery, the supporting salt forms lithium ions. Examples of supporting salts include fluorine-containing lithium salts such as $LiPF_6$ and $LiBF_4$.

The solvent may be, for example, water or an organic solvent other than water (nonaqueous solvent). The solvent may be a protic solvent having a proton-donating structural moiety and may be an aprotic solvent having no proton-donating structural moiety. Exemplary solvents include organic solvents such as carbonates, ethers, esters, nitriles, sulfones and lactones, and also water. In the electrolyte battery in which the working voltage of the positive electrode is set higher than in the prior art, such as at least about 4.3 V versus lithium metal, a solvent having a high oxidation resistance (i.e., a high oxidative decomposition potential) is preferred. Examples of high oxidation resistance solvents include fluorides of organic solvents (fluorine-containing solvents), as well as ethers and protic solvents. A drawback of high oxidation resistance solvents is that they tend to have a low reduction resistance. Therefore, when using a high oxidation resistance solvent, it is preferable to employ the art disclosed herein (i.e., art for increasing the reduction resistance).

Of the above solvents, fluorine-containing solvents are preferred because of their high affinity with the negative electrode material 1. Fluorine-containing solvents are solvents having a chemical structure in which one or two or more hydrogen atoms on a solvent lacking fluorine as a constituent element are substituted with fluorine atoms. Examples of fluorine-containing solvents include fluorinated carbonates including fluorinated cyclic carbonates such as monofluoroethylene carbonate (MFEC) and difluoroethylene carbonate (DFEC); and fluorinated acyclic carbonates such as fluoromethylmethyl carbonate, difluoromethylmethyl carbonate and methyl(2,2,2-trifluoroethyl) carbonate (MTFEC). Of these, fluorous (perfluorinated) solvents, in which all hydrogen atoms on a solvent lacking fluorine as a constituent element are substituted with fluorine atoms, are preferred. By including a fluorine-containing solvent in the electrolyte, the wettability by the electrolyte of the negative electrode material 1 increases and the interfacial resistance between the negative electrode and the electrolyte can be kept low. As a result, the input-output characteristics can be improved.

The volume-based content of the fluorine-containing solvent per 100 vol. % of the overall solvent, although not particularly limited, may be generally at least 50 vol %, and preferably at least 80 vol %, such as at least 95 vol %. In addition to the supporting salt and solvent, the electrolyte may include optional ingredients, examples of which include film-forming agents such as lithium bis(oxalate) borate (LiBOB) and vinylene carbonate (VC), and gas-forming agents such as biphenyl (BP) and cyclohexylbenzene (CHB).

In an electrolyte battery constituted in the above manner, reductive decomposition of the electrolyte at the negative electrode can be favorably suppressed even in cases where the electrolyte includes a fluorine-containing solvent. That is, the negative electrode material 1 has, on the surface of the negative electrode active material 2, a coating material 4 made up of a fluoride ion conductor. Hence, during charging, the negative charge builds up in the state of fluoride ions ($F^-$) rather than electrons ($e^-$) on the surface of the negative electrode. As a result, it becomes more difficult for the fluorine-containing solvent to accept electrons from the negative electrode. In other words, the transfer of electrons from the negative electrode to the fluorine-containing solvent occurs with greater difficulty. In addition, because the negative electrode material 1 includes a coating material 4, the wettability by the fluorine-containing solvent rises, making it possible to keep the resistance of the negative electrode low. By virtue of these effects, the art disclosed herein enables electrolyte batteries of high durability and excellent cycle characteristics to be advantageously achieved.

The art disclosed herein can be advantageously applied to "5 V" class electrolyte batteries in which, typically, the working voltage at the positive electrolyte in the 0% to 100% SOC range, versus lithium metal, is generally at least 4.3 V, preferably at least 4.5 V, and more preferably at least 4.6 V, and is generally not more than 7.0 V. preferably not more than 6.0 V, and more preferably not more than 5.5 V. By elevating the working voltage at the positive electrode, an electrolyte battery having a high energy density can be achieved.

Electrolyte Battery Applications

Although electrolyte batteries which include the negative electrode material 1 in the negative electrode can be used in a variety of applications, compared with conventional products, the reductive decomposition of the electrolyte is suppressed and the battery durability is excellent. Preferably, by raising the working voltage of the positive electrode, the battery moreover possesses both a high durability and also a high energy density. Accordingly, by taking full advantage of these features, the electrolyte battery disclosed herein can be advantageously used as a power source for on-board vehicle motors (power source for vehicle propulsion). The types of vehicle typically include, without particular limitation vehicle such as plug-in hybrid vehicles (PHVs), hybrid vehicles (HVs) and electric vehicles (EVs). The electrolyte battery may be used in the form of a battery pack in which a plurality of such batteries are connected in series and/or in parallel.

The invention is illustrated more fully by way of the following examples, although it is to be understood that these examples are not intended to limit the invention.

Test Example 1: Examination of Average Coating Thickness of Coating Material Production of Negative Electrode Material First, graphitic carbon material having an average particle size of 20 μm was furnished as the negative electrode active material. Next, using $Pb_{0.5}Sn_{0.5}F_2$ as the target, $Pb_{0.5}Sn_{0.5}F_2$ was deposited onto the surface of the graphitic carbon material by barrel PLD. The average coating thickness of $Pb_{0.5}Sn_{0.5}F_2$ at this time was set to variously 2 nm, 4 nm, 6 nm, 8 nm, 10 nm, 50 nm and 100 nm by adjusting the deposition time. The surface of the graphitic carbon material was coated in this way with $Pb_{0.5}Sn_{0.5}F_2$, thereby producing a negative electrode material composed of a graphitic carbon material and a coating material ($Pb_{0.5}Sn_{0.5}F_2$) placed on the surface thereof. For purposes of comparison, graphitic carbon material not coated with $Pb_{0.5}Sn_{0.5}F_2$ was furnished as well. These negative electrode materials were then used as described below to build lithium ion secondary batteries.

Construction of Lithium Ion Secondary Battery

First, a negative electrode slurry was prepared by mixing together the negative electrode material obtained above, styrene-butadiene rubber as the binder and carboxymethylcellulose as the thickener in deionized water. The negative electrode slurry was coated onto the surface of copper foil (negative electrode current collector), dried and then pressed, thereby producing a negative electrode having a negative electrode active material layer on a negative electrode current collector.

Next, a positive electrode slurry was prepared by mixing together $LiNi_{1/3}Co_{1/3}Mn_{1/3}O_2$ (average particle size, 5 μm) as the positive electrode active material, acetylene black as the conductor and polyvinylidene fluoride as the binder in N-methyl-2-pyrrolidone. This positive electrode slurry was coated onto the surface of aluminum foil (positive electrode current collector), dried and then pressed, thereby producing a positive electrode having a positive electrode active material layer on a positive electrode current collector.

The positive electrode and negative electrode thus produced were then placed over one another with a porous separator therebetween, thereby producing an electrode assembly. Next, electrolyte was prepared by dissolving $LiPF_6$ as the supporting salt to a concentration of 1.0 mol/L in a mixed solvent containing difluoroethylene carbonate (DFEC) and dimethylcarbonate (DMC) in the volumetric ratio DFEC:DMC=5:5. The resulting electrode assembly and electrolyte were then placed in a laminated film casing and the casing was sealed, thereby completing the construction of a lithium ion secondary battery.

Evaluation of Cycle Characteristics

The cycle characteristics of the lithium ion secondary battery constructed above were evaluated in a 25° C. environment. Specifically, the lithium ion secondary battery was subjected to a total of 20 charge-discharge cycles, each consisting of constant-current charging at a rate of 1 C up to a battery voltage of 5 V, followed by constant-current discharging at a rate of 1 C down to a battery voltage of 3 V. Here, "1 C" refers to the current value that can charge the battery in one hour to the battery capacity (Ah) predicted from the theoretical capacity of the positive electrode active material. The cycle capacity retentions (%) are computed as the battery capacities at each cycle divided by the battery capacity at the first cycle. The results are shown in FIG. 3.

Figure 3:
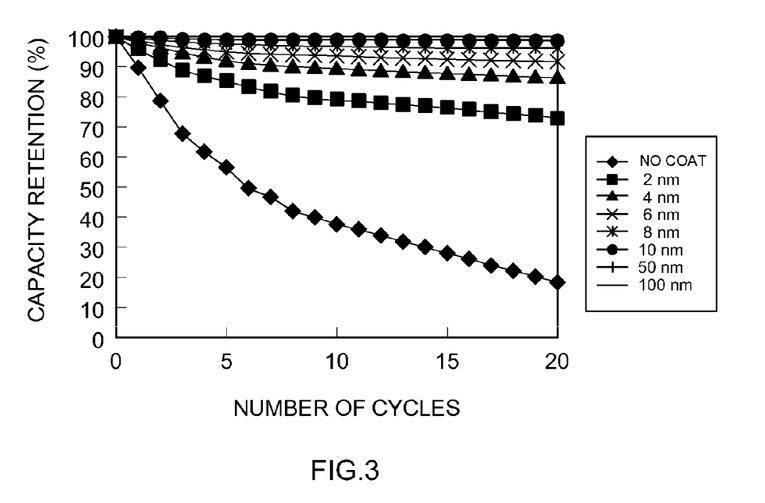
FIG. 3 is a graph showing the change in capacity retention in Test Example 1.

FIG. 3 is a graph showing the change in capacity retention infest Example 1. As shown in FIG. 3, when uncoated graphitic carbon material was used, the capacity retention markedly decreased with an increasing number of charge-discharge cycles, with the capacity retention after 20 cycles falling to 20% or below. That is, the degradation factor as a manufactured product was too large. The reason is thought to be that, because the battery was charged to a battery voltage of 5 V, the negative electrode entered into an overcharged state, resulting in reductive decomposition of the electrolyte (especially DFEC). By contrast, when negative electrode materials were used in which $Pb_{0.5}Sn_{0.5}F_2$ was coated to an average coating thickness of 2 to 100 nm on the surface of graphitic carbon material, the relative decrease in capacity retention was suppressed. In other words, the cycle durability was improved. In particular, when the average coating thickness was at least 10 nm, the capacity retention after 20 cycles was substantially 100% (at least 98%). The primary reason for such an improvement in cycle durability appears to be suppression of reductive decomposition of the electrolyte at the negative electrode.

Test Example 2: Examination of Coating Material Composition

In Test Example 2, $PbF_2$ and $SnF_2$ were furnished as the targets. $PbF_2$ and $SnF_2$ were mixed together based on the stoichiometry and used as the target in such a way as to satisfy the formula $P_{(1-x)}Sn_xF_2$(x=0, 0.2, 0.4, 0.5, 0.6). Next, as in Test Example 1, $Pb_{(1-x)}Sn_xF_2$ (x=0, 0.2, 0.4, 0.5, 0.6) vas deposited on the surface of the graphitic carbon material to an average coating thickness of 50 nm, thereby producing negative electrode materials. Then, as infest Example 1, lithium ion secondary batteries were built using these negative electrode materials and the cycle characteristics of the lithium ion secondary batteries were evaluated. The results are shown in FIGS. 4 and 5.

Figure 4:
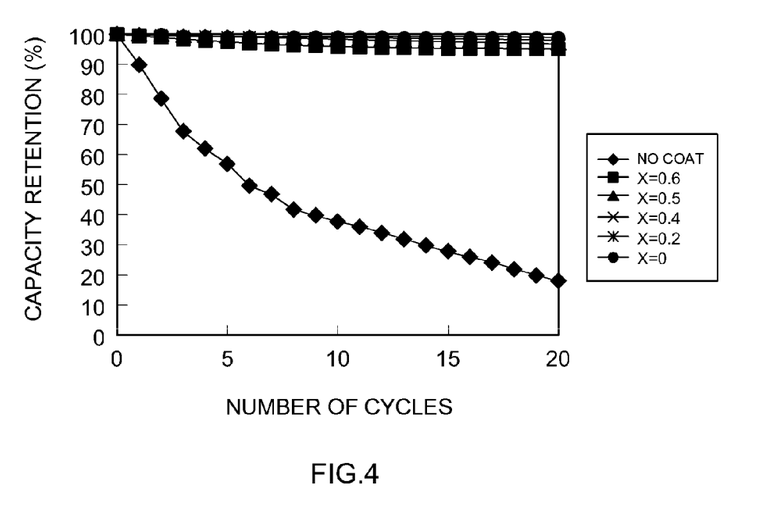
FIG. 4 is a graph showing the change in capacity retention in Test Example 2.
Figure 5:
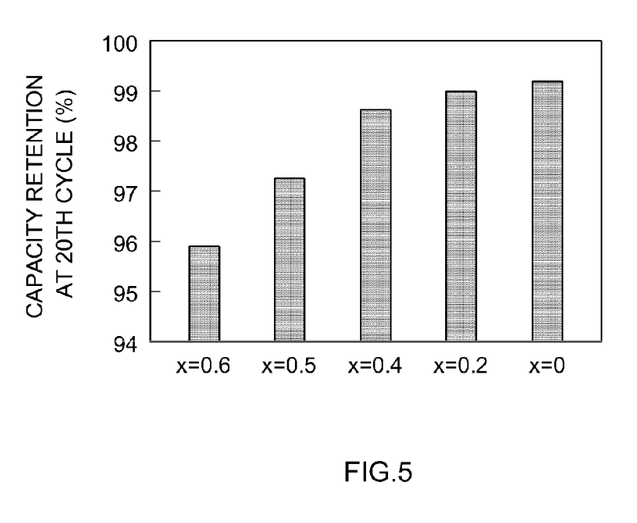
FIG. 5 is a graph which compares the capacity retention at the 20th cycle in Test Example 2.

FIG. 4 is a graph shown the change in capacity retention in Test Example 2. FIG. 5 is a graph which compares the capacity retention at the 20th cycle in Test Example 2. As shown in FIG. 4, when negative electrode materials were used in which $Pb_{(1-x)}Sn_xF_2$ (0≤x≤0.6) was coated on the surface of graphitic carbon material, the decrease in capacity retention was kept relatively low compared with when an uncoated graphitic carbon material was used. In particular, as shown in FIG. 5, at a smaller value of x, i.e., at a lower Sn content, the capacity retention at the 20th cycle was higher. In other words, the cycle durability was excellent.

These results confirm the technical significance of the art disclosed herein.

The terms and expressions used herein are for description only and are not to be interpreted in a limited sense. These terms and expressions should be recognized as not excluding any equivalents to the elements shown and described herein and as allowing any modification encompassed in the scope of the claims. Tice preferred embodiments disclosed herein may be embodied in many various forms. This disclosure should be regarded as providing preferred embodiments of the principle of the invention. These preferred embodiments are provided with the understanding that they are not intended to limit the invention to the preferred embodiments described in the specification and/or shown in the drawings. The invention is not limited to the preferred embodiment described herein. The invention disclosed herein encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or used during the prosecution of the present application.

What is claimed is:

1. A negative electrode material for a lithium ion battery, comprising:
    a graphitic carbon material as a negative electrode active material for the lithium ion battery, and
    a coating material disposed on a surface of graphitic carbon material, wherein the coating material is a fluoride ion conductor that includes lead, tin, and fluorine,
    the fluoride ion conductor includes a solid solution of the following formula (1):

$$Pb_{(1-x)}Sn_xF_{2+\delta} \qquad (1),$$

wherein, in formula (1), x satisfies 0<x≤0.6 and δ is a real number that achieves charge neutrality.

2. The negative electrode material according to claim 1, wherein the graphitic carbon material is approximately spherical with an average aspect ratio of 1 or more and 1.5 or less.

3. The negative electrode material according to claim 1, wherein x satisfies 0<x≤0.2.

4. The negative electrode material according to claim 1, wherein the coating material has an average coating thickness of at least 10 nm and up to 100 nm.

5. The negative electrode material according to claim 1, wherein a plurality of dots comprising said coating material are arranged on the surface of graphitic carbon material.

6. A lithium ion battery comprising:
    a positive electrode, a negative electrode, and an electrolyte, wherein
    the negative electrode includes a negative electrode material according to claim 1, and
    the electrolyte includes a fluorine-containing solvent.

* * * * *